(12) United States Patent
Cardenas

(10) Patent No.: US 11,085,472 B2
(45) Date of Patent: Aug. 10, 2021

(54) CONCRETE FORM BOARD SLEEVE CONNECTOR

(71) Applicant: Sergio Cardenas, Pasco, WA (US)

(72) Inventor: Sergio Cardenas, Pasco, WA (US)

( * ) Notice: Subject to any disclaimer, the term of this patent is extended or adjusted under 35 U.S.C. 154(b) by 0 days.

(21) Appl. No.: 16/552,598

(22) Filed: Aug. 27, 2019

(65) Prior Publication Data
US 2020/0087934 A1 Mar. 19, 2020

Related U.S. Application Data

(60) Provisional application No. 62/732,317, filed on Sep. 17, 2018.

(51) Int. Cl.
*E04G 17/02* (2006.01)
*E01C 19/50* (2006.01)
*F16B 7/04* (2006.01)
*F16B 7/00* (2006.01)

(52) U.S. Cl.
CPC .......... *F16B 7/0426* (2013.01); *E01C 19/502* (2013.01); *E04G 17/02* (2013.01); *F16B 7/00* (2013.01)

(58) Field of Classification Search
CPC ........ F16B 7/0426; F16B 7/00; F16B 7/0406; E04G 17/02; E01C 19/50; E01C 19/502
USPC .......... 403/305, 300, 178, 179; 52/848, 843, 52/845, 846, 639, 642, FOR. 117, 52/FOR. 124, FOR. 160, FOR. 126, 52/FOR. 133, FOR. 134, FOR. 137, 52/FOR. 139, FOR. 141, FOR. 142; 249/6
See application file for complete search history.

(56) References Cited

U.S. PATENT DOCUMENTS

| 444,579 | A | * | 1/1891 | Jackson | F16G 11/04 403/314 |
|---|---|---|---|---|---|
| 540,834 | A | * | 6/1895 | Gumm | E21B 17/023 403/184 |
| 1,073,614 | A | * | 9/1913 | McDearmid | E02D 5/523 405/251 |
| 1,158,895 | A | * | 11/1915 | Clark | E04C 5/165 403/305 |
| 1,358,918 | A | * | 11/1920 | Arnandez | E01B 11/10 403/319 |
| 1,428,076 | A | * | 9/1922 | Clark | B43K 23/06 403/305 |
| 1,458,666 | A | * | 6/1923 | Stoppello | E04G 7/20 403/305 |

(Continued)

FOREIGN PATENT DOCUMENTS

| DE | 1759128 A1 * | 3/1972 | .......... E04D 12/004 |
|---|---|---|---|
| EP | 0159479 A2 * | 10/1985 | ............ F16B 7/0426 |

(Continued)

*Primary Examiner* — Michael Safavi
(74) *Attorney, Agent, or Firm* — Boudwin Intellectual Property; Daniel Boudwin

(57) ABSTRACT

A concrete form board sleeve connector included a top section and a bottom section connected together. The top section and the bottom section form a rectangular shape with an interior volume. There are openings at opposing ends of the rectangular shape, the openings are configured to accept the ends of two different boards. A middle section is placed within the rectangular shape and is designed to prevent the board ends from going all the way through the rectangular object.

15 Claims, 6 Drawing Sheets

(56) References Cited

U.S. PATENT DOCUMENTS

| | | | | |
|---|---|---|---|---|
| 1,505,680 A | * | 8/1924 | Walker | E04B 1/2608 403/178 |
| 1,688,063 A | * | 10/1928 | Trainor | E04H 12/04 403/312 |
| 1,692,798 A | * | 11/1928 | Potter | H02G 3/06 285/383 |
| 1,770,852 A | * | 7/1930 | Hill | F16L 13/08 285/289.1 |
| 2,055,040 A | * | 9/1936 | Miller | E01C 19/502 249/6 |
| 2,931,129 A | * | 4/1960 | Boniface | A63H 33/101 446/126 |
| 2,983,104 A | * | 5/1961 | Bruns | E02D 5/58 405/252 |
| 3,070,197 A | * | 12/1962 | Musselman | E06B 3/726 52/656.4 |
| 3,207,465 A | | 9/1965 | Papin | |
| 3,284,971 A | * | 11/1966 | Attwood | A47B 96/1408 52/100 |
| 3,414,300 A | * | 12/1968 | Spane | E04C 3/42 403/300 |
| 3,460,859 A | * | 8/1969 | Keating | F24F 13/0209 285/319 |
| 3,512,805 A | * | 5/1970 | Glatz | F16L 21/005 285/109 |
| 3,725,976 A | * | 4/1973 | MacKeown | F16G 7/00 24/31 C |
| 3,753,545 A | * | 8/1973 | Stegmeier | E04G 17/00 249/219.1 |
| 3,989,396 A | * | 11/1976 | Matsumoto | E04B 1/2403 403/174 |
| 3,999,353 A | * | 12/1976 | Dielman | E04F 11/1814 52/835 |
| 4,063,422 A | * | 12/1977 | Maher | E02D 5/523 405/231 |
| 4,140,417 A | * | 2/1979 | Danielsen | F16B 7/0426 403/293 |
| 4,291,858 A | | 9/1981 | NeSmith | |
| 4,385,476 A | * | 5/1983 | Slager | E04B 5/14 52/634 |
| 4,458,668 A | * | 7/1984 | Sheldon | E04H 4/10 126/565 |
| 4,494,094 A | * | 1/1985 | Spinner | H01P 3/12 138/171 |
| 4,512,680 A | * | 4/1985 | Tomaszewski | F16B 7/0426 403/313 |
| 4,516,874 A | * | 5/1985 | Yang | F16B 5/126 403/313 |
| 4,537,534 A | * | 8/1985 | Marsh, Jr. | E02D 5/523 403/282 |
| 4,654,540 A | * | 3/1987 | Bridges | H01H 33/022 307/126 |
| 4,809,476 A | * | 3/1989 | Satchell | E04B 2/789 52/241 |
| 5,156,753 A | | 10/1992 | Speidel | |
| 5,343,667 A | | 9/1994 | Peden | |
| 5,376,423 A | * | 12/1994 | Wiegand | F16B 7/0426 24/289 |
| 5,535,555 A | * | 7/1996 | Boyd | E01F 9/635 248/548 |
| 5,562,272 A | * | 10/1996 | McAbee | E01C 19/502 249/192 |
| 5,660,005 A | * | 8/1997 | Tacoma | E04B 1/24 52/222 |
| 5,782,040 A | * | 7/1998 | McCartan | E01F 9/635 345/690 |
| 6,098,353 A | * | 8/2000 | Stanfield | E01F 9/685 52/169.13 |
| 6,327,823 B1 | * | 12/2001 | Emms | E04B 1/2403 52/93.2 |
| 6,401,412 B1 | * | 6/2002 | Cooper | E04D 3/3607 52/198 |
| 7,229,062 B1 | | 6/2007 | Rascon | |
| 7,380,876 B1 | * | 6/2008 | Barthelemy | B62D 25/00 29/897.2 |
| 7,762,042 B2 | * | 7/2010 | Packard, III | H02G 3/0608 52/848 |
| 8,028,494 B2 | * | 10/2011 | Denn | E04B 1/2403 52/848 |
| 8,276,345 B2 | * | 10/2012 | Brady | E06B 3/9642 52/839 |
| 8,448,395 B2 | * | 5/2013 | Ivarsson | E04B 2/767 52/210 |
| 9,027,309 B2 | * | 5/2015 | Gallagher, Jr. | C21D 7/13 52/846 |
| 9,376,797 B2 | * | 6/2016 | Yang | E04B 1/2403 |
| 9,803,365 B2 | * | 10/2017 | Peltier | E04C 3/083 |
| 2001/0004825 A1 | * | 6/2001 | Menendez | E04C 3/07 52/846 |
| 2003/0184075 A1 | * | 10/2003 | Freeman | B62D 21/00 280/797 |
| 2004/0074200 A1 | * | 4/2004 | Attalla | E04B 2/789 52/846 |
| 2004/0093825 A1 | * | 5/2004 | Lee | E04C 3/32 52/843 |
| 2004/0179892 A1 | * | 9/2004 | Du Preez | E04D 12/004 403/300 |
| 2007/0107368 A1 | * | 5/2007 | Ruehl | E04C 3/07 52/843 |
| 2010/0126106 A1 | * | 5/2010 | Ivarsson | E04B 2/767 52/696 |
| 2012/0060443 A1 | * | 3/2012 | Vernon | E04C 3/29 52/834 |

FOREIGN PATENT DOCUMENTS

| | | | | |
|---|---|---|---|---|
| EP | 2009214 A2 | * | 12/2008 | E05D 15/0652 |
| GB | 979213 A | * | 1/1965 | F16B 7/0426 |
| GB | 1431886 A | * | 4/1976 | E04G 7/20 |
| GB | 2032501 A | * | 5/1980 | E04B 1/7046 |
| GB | 2059480 A | * | 4/1981 | E04C 3/02 |
| GB | 2132305 A | * | 7/1984 | F16B 7/22 |
| GB | 2174430 A | * | 11/1986 | E04C 3/10 |
| GB | 2248249 A | * | 4/1992 | E04B 1/5831 |
| GB | 2312724 A | * | 11/1997 | E04D 12/00 |

* cited by examiner

CONCRETE FORM BOARD SLEEVE CONNECTOR

CROSS REFERENCE TO RELATED APPLICATIONS

This application claims the benefit of U.S. Provisional Application No. 62/732,317 filed on Sep. 17, 2018. The above identified patent application is herein incorporated by reference in its entirety to provide continuity of disclosure.

BACKGROUND OF THE INVENTION

The present invention relates to a concrete form board sleeve connector. More particularly, the present invention provides a rectangular sleeve that is configured to accept the ends of boards through openings at both ends.

Concrete is used in all manners of construction projects around the world. In order to create various structures from concrete, forms are needed. Traditionally, forms are built from connecting boards together end to end. In the past, this meant having to nail or screw the various boards together. This often times means using a smaller sized board to support the form. This can be a long and painstaking process. When having to take the boards apart, each screw will have to be removed or the nails pried from the boards.

Consequently, there is a need in for an improvement in the art of connecting boards for concrete forms. The present invention substantially diverges in design elements from the known art while at the same time solves a problem many people face when having to assemble forms for pouring concrete. In this regard the present invention substantially fulfills these needs.

SUMMARY OF THE INVENTION

The present invention provides a concrete form board sleeve connector wherein the same can be utilized for providing convenience for the user when using concrete forms in construction or other projects. The concrete form board sleeve connector comprises, a sleeve having a bottom section, a top section, and a pair of sidewalls. The bottom section and the top section are connected together by the sidewalls. The sleeve has an opening at each of opposing ends, wherein the opening is configured to accept a board end in each of the openings. A middle section is attached to the bottom section and is configured to prevent boards from going all the way through the sleeve.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
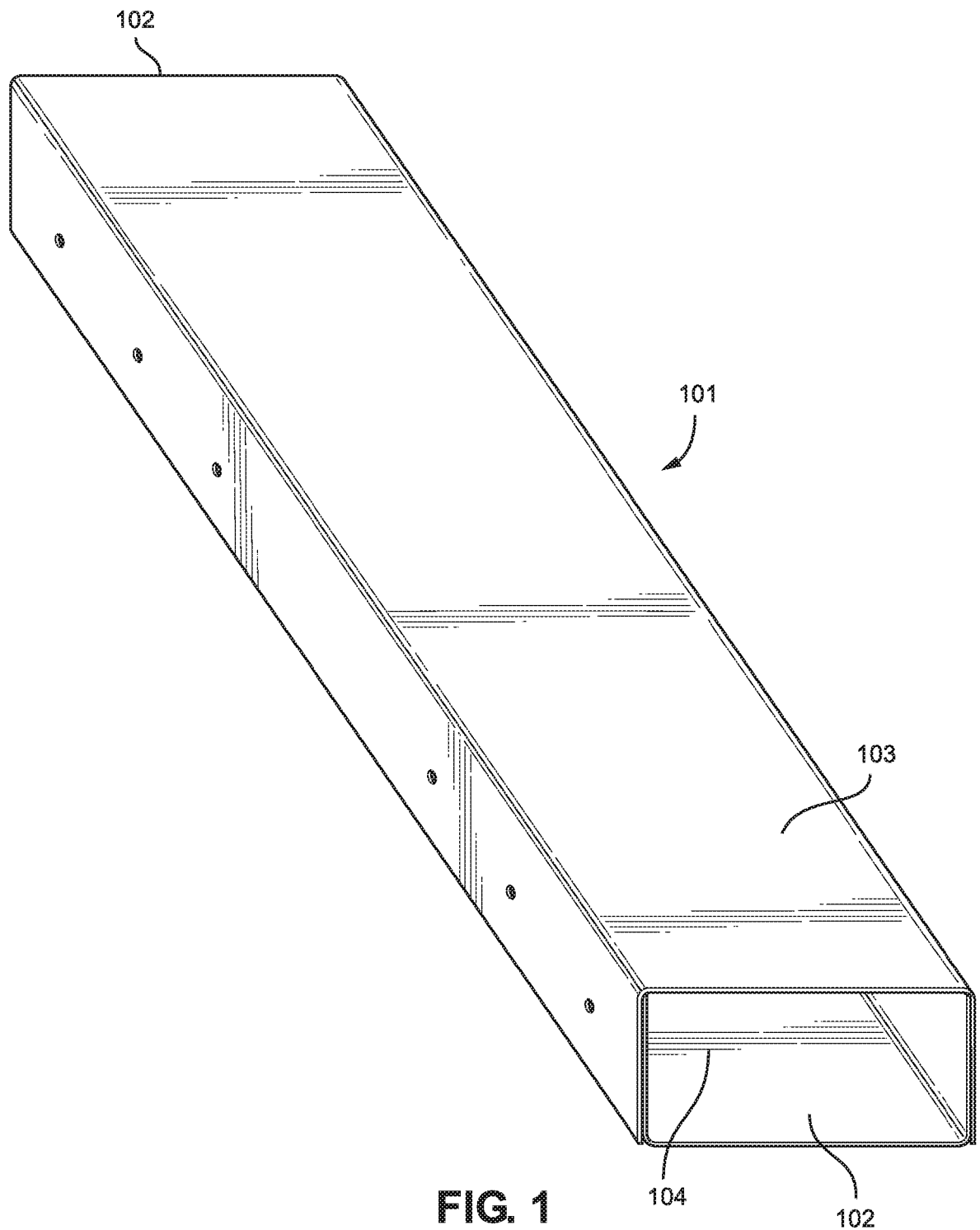
FIG. 1 shows a perspective view of an embodiment of the concrete form board sleeve connector.

Reference is made herein to the attached drawings. Like reference numerals are used throughout the drawings to depict like or similar elements of the concrete form board sleeve connector. For the purposes of presenting a brief and clear description of the present invention, a preferred embodiment will be discussed as used for the concrete form board sleeve connector. The figures are intended for representative purposes only and should not be considered to be limiting in any respect.

Referring now to FIG. 1, there is shown a perspective view of an embodiment of the concrete form board sleeve connector. The concrete form board sleeve connector is a sleeve 101 having openings 102 at both ends thereof. The openings 102 are configured to accept the ends of boards therein. In one embodiment, the sleeve 101 is made from steel. In one embodiment, the sleeve 101 is made from iron. In one embodiment, the sleeve 101 is made from a durable plastic.

The sleeve 101 is made from a top section 103 and a bottom section 104. The top section 103 and the bottom section 104 are connected together to form the sleeve 101. In one embodiment, the top section 103 and the bottom section 104 are spot welded together. In another embodiment, the top section 103 and the bottom section 104 are held together with rivets. In one embodiment the top section 103 and the bottom section 104 are U-shaped. This embodiment will be discussed in FIG. 2 and FIG. 3.

Figure 2:
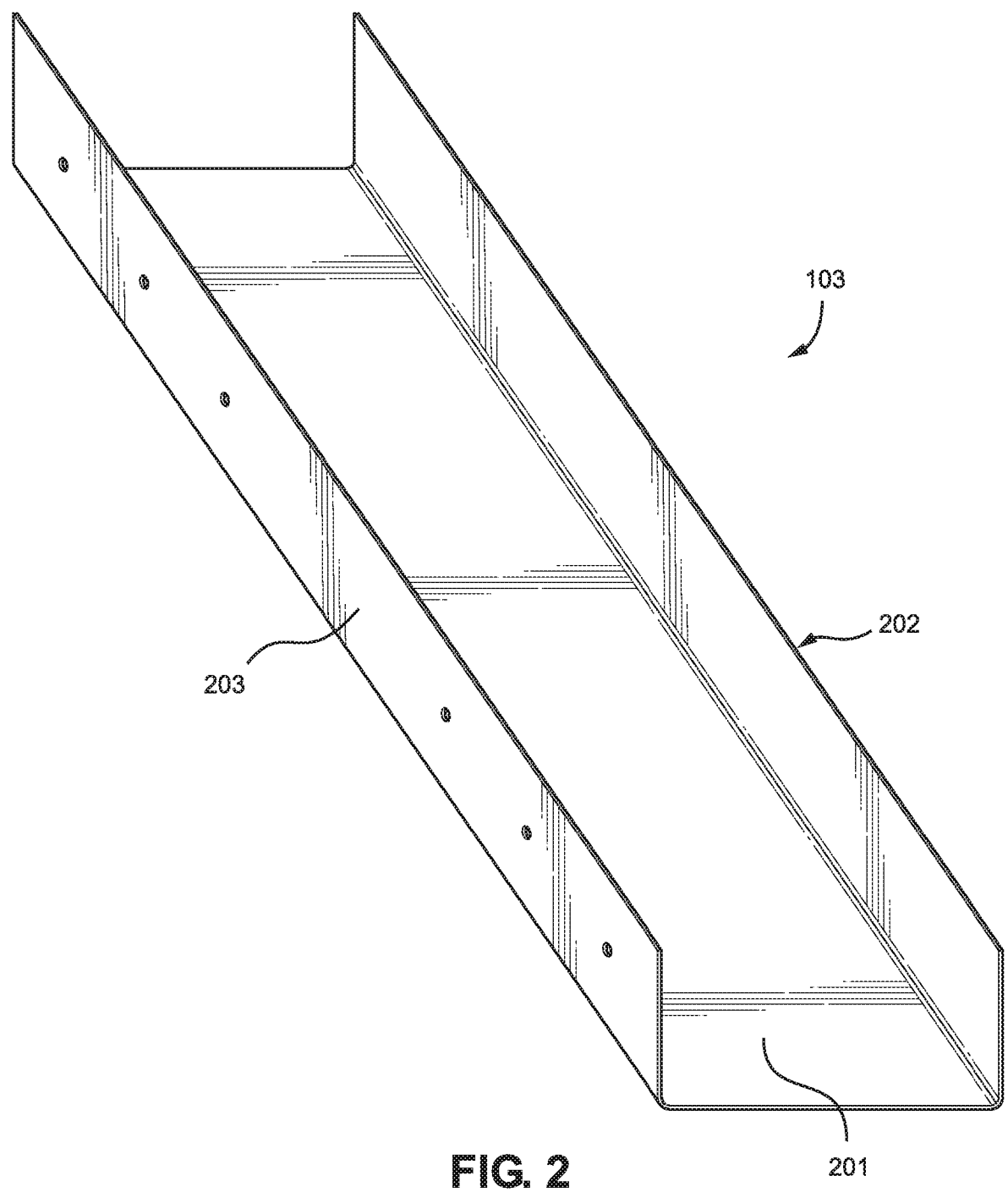
FIG. 2 shows a perspective view of an embodiment of the top section of the concrete form board sleeve connector.

Referring now to FIG. 2, there is shown a perspective view of an embodiment of the top section of the concrete form board sleeve connector. The top section 103 is made from a single piece of metal. The top section 103 is comprised of a large flat section 201 and a bent edge 202. The bent edge 202 will form a sidewall of the sleeve. In some embodiments, the top section 103 further comprises a second bent edge 203 to allow for an overlap with the bottom section. This can allow for easier welding.

Figure 3:
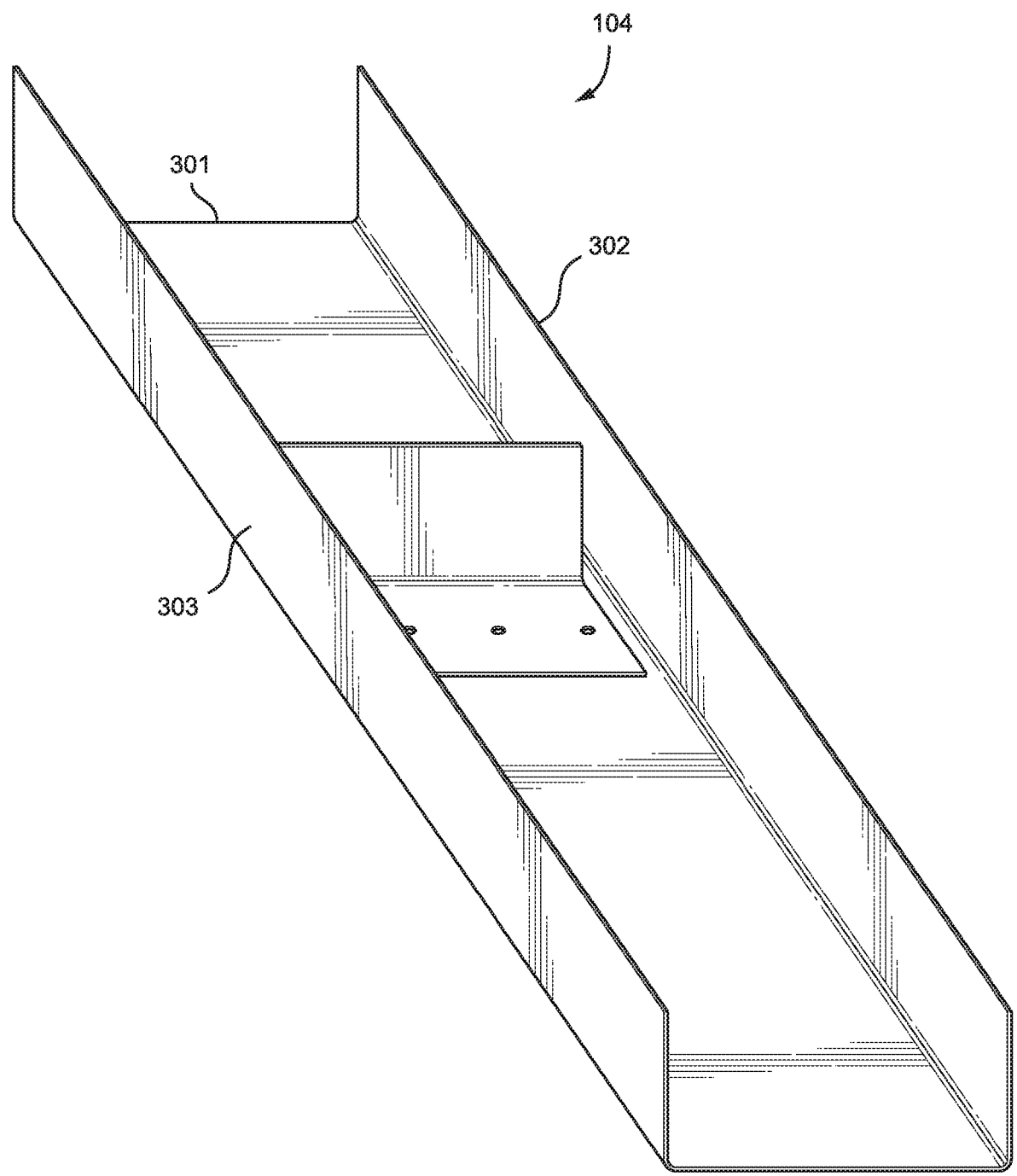
FIG. 3 shows a perspective view of an embodiment of the bottom section of the concrete form board sleeve connector.

Referring now to FIG. 3, there is shown a perspective view of an embodiment of the bottom section of the concrete form board sleeve connector. The bottom section 104 of the concrete form board sleeve connector is made from a single piece of metal. The bottom section 104 has a large flat section 301 and a bent edge 302. The bent edge 302 will form a sidewall of the sleeve. In some embodiments there can be a second bent edge 303 to allow for a small overlap with the top section. This can allow for easier welding.

Figure 4:
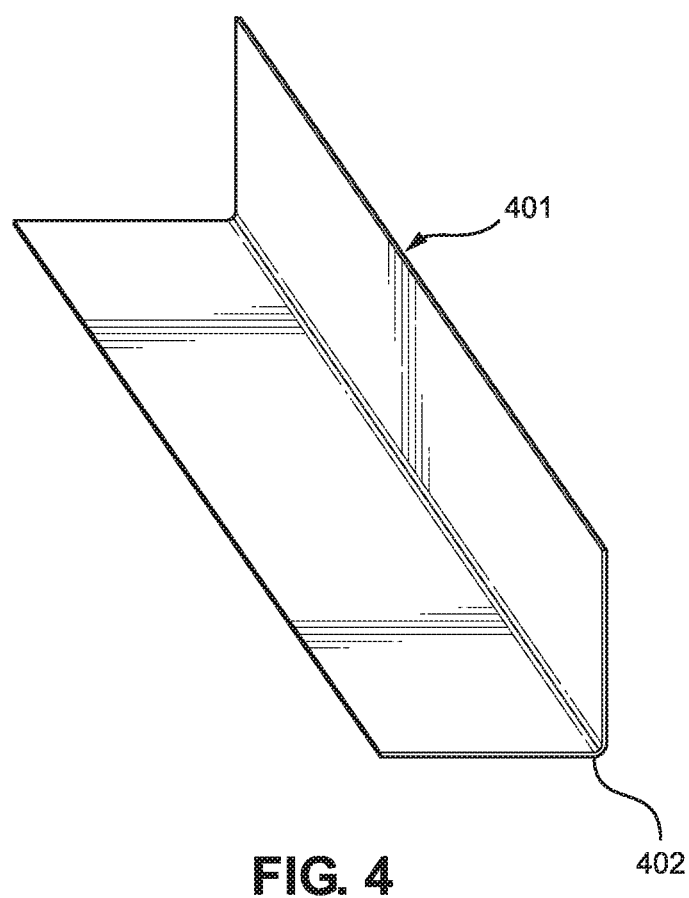
FIG. 4 shows a perspective view of an embodiment of the middle section of the concrete form board sleeve connector.

Referring now to FIG. 4, there is shown a perspective view of an embodiment of the middle section of the concrete form board sleeve connector. In some embodiments, there is a middle section 401 disposed within the sleeve. The middle section 401 is disposed in a disposed perpendicularly within the sleeve, extending transversely across the bottom section to function as a stopper. Just trying to add some more detail. The middle section 401 is meant to function as a stopper. The middle section 401 will stop boards from being pushed all the way through the sleeve. In one embodiment, the middle section 401 has a bent end 402. This bent end is bent at approximately 90 degrees. This will allow for board ends to sit flush against the middle section 401.

In one embodiment, the middle section 401 is welded into the sleeve. This weld is done by attaching the bent end 402 to either the top section or the bottom section. This will secure the middle section 401 to the sleeve. In another embodiment, the middle section 401 is part of the bottom section. In this embodiment, the bottom section will be cut to allow for a section to be bent toward the interior of the sleeve. This will allow for the middle section 401 to be a part of the bottom section and remove the need for an additional piece to serve as the middle section.

Figure 5:
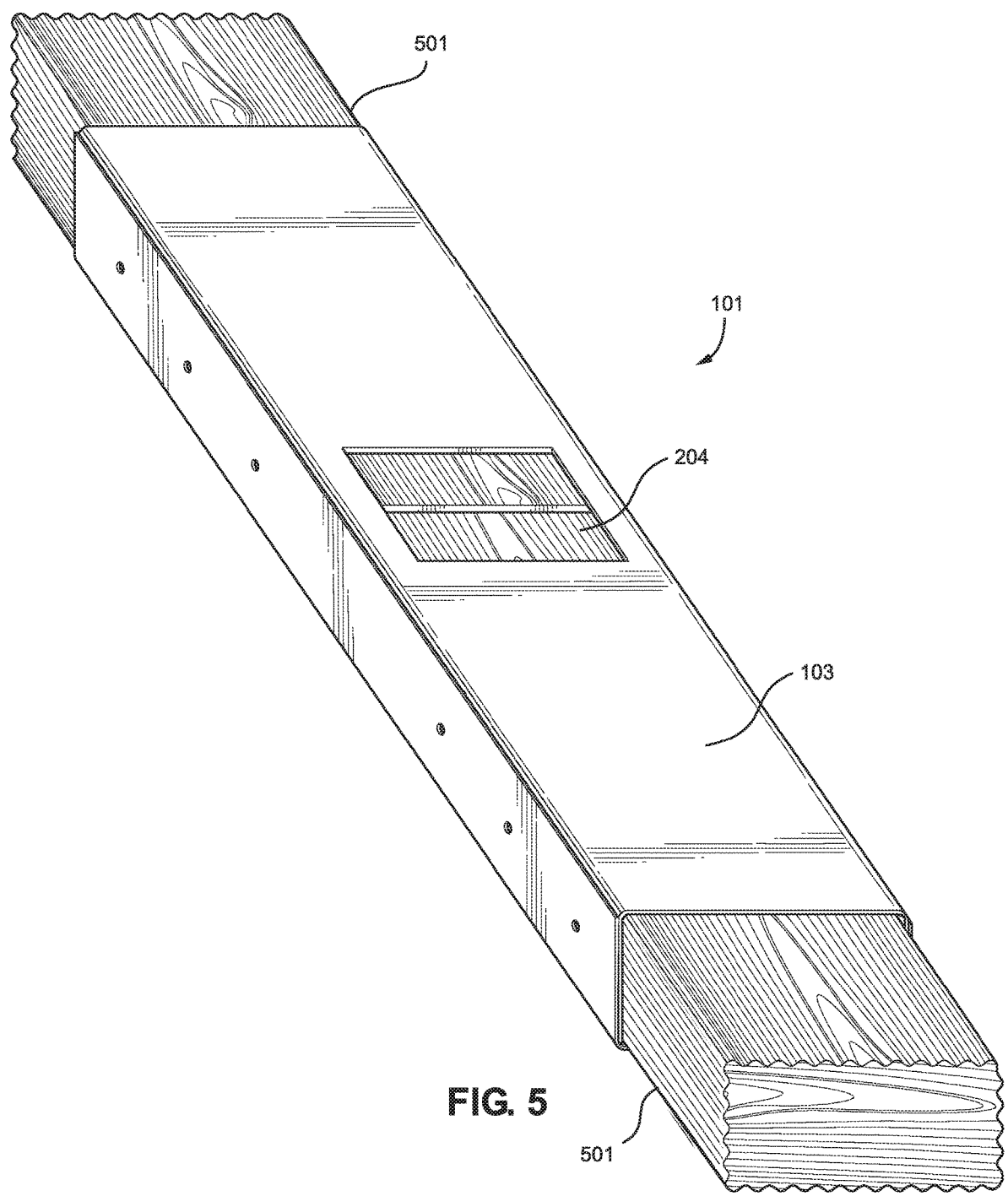
FIG. 5 shows an in-use view of an embodiment of the concrete form board sleeve connector.

Referring now to FIG. 5, there is shown an in-use view of an embodiment of the concrete form board sleeve connector. In one embodiment, the bottom section 104 can have a cut-out section forming a window 204. The window 204 is disposed in the middle of the bottom section 104. The window 204 is located such that each side of the middle section can be seen through the window 204. The window 204 is used to allow a user to be able to tell where a board end is within the sleeve.

In use, the sleeve 101 holds the ends of two separate boards 501. Each of the boards is placed into the sleeve 101 until it is pressed against the middle section. In the embodiments where there is a window 204, a user can use the window 204 to determine when the boards are in the sleeve 101 properly. Once the boards are placed in the concrete form board sleeve connector, they are held in place and concrete can be poured.

Figure 6:
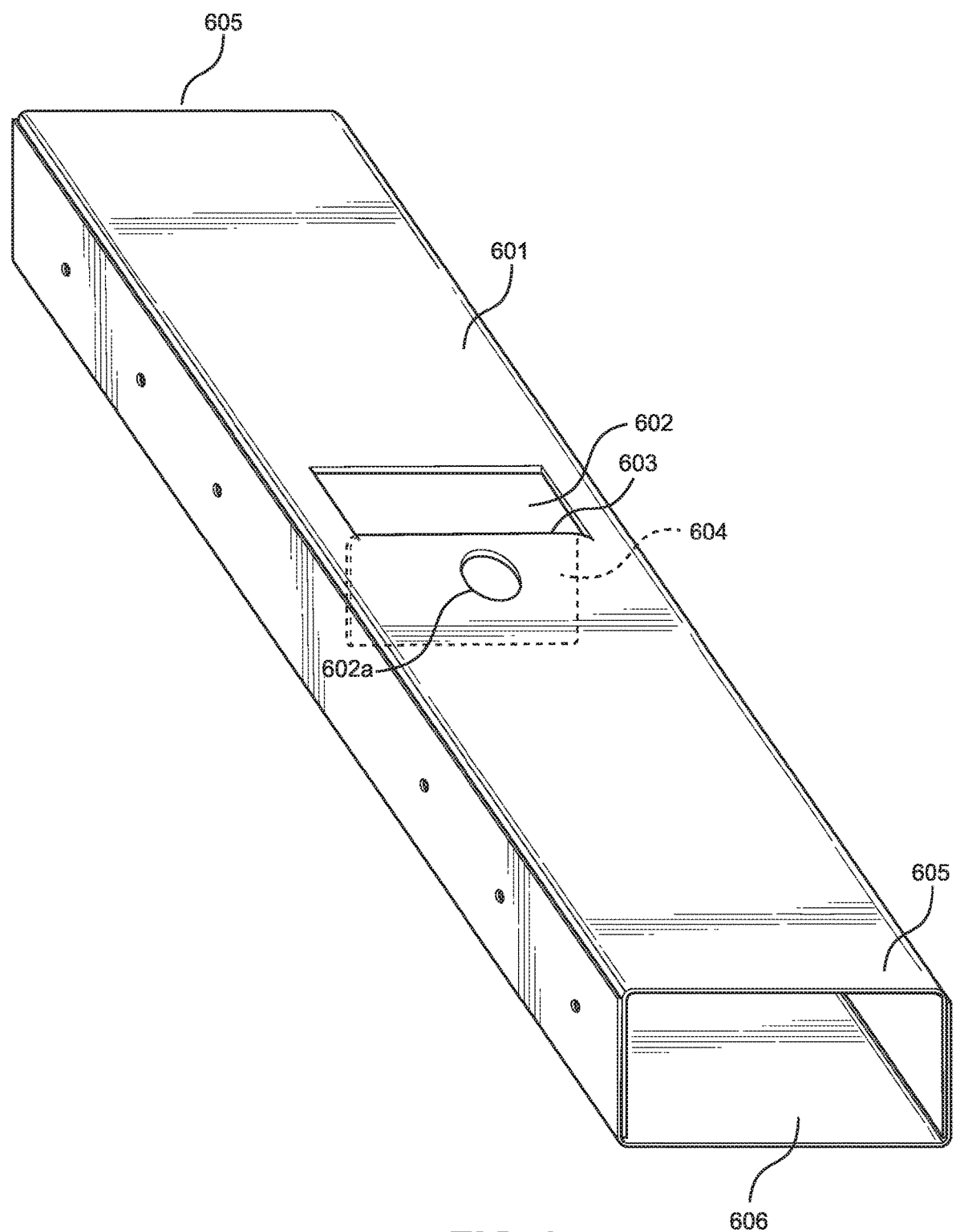
FIG. 6 shows a perspective view of an embodiment of the concrete form board sleeve connector with a flared end and a different window configuration.

Referring now to FIG. 6, there is shown a perspective view of an embodiment of the concrete form board sleeve connector with a flared end and a different window configuration. In this configuration there is a bottom section 601 and a top section 606. The bottom section 601 is configured to have a pair of sidewalls and the top section 606 is configured to have a pair of sidewalls. The bottom section 601 is configured to be slightly wider than the top section 606. This allows the bottom section 601 to be fitted over the top section 606. The sidewalls can then be attached together using any manner of fastener.

The bottom section 601 further has a unique middle section 604 and window 602, 602a configuration. In this configuration the window 602, is formed by cutting three sides. Further, there is a second window hole 602, a cut such that the user can also see the opposite side of the middle section 604. The fourth side 603 is then bent inwardly toward the middle of the device. This cut out will form the middle section 604 of the device.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A concrete form board sleeve connector, comprising:
a sleeve having a bottom section comprising a U-shaped member having a bottom planar portion and a pair of bottom sidewalls extending from opposing lateral sides of the bottom planar portion;
a top section comprising a U-shaped member having a top planar portion and a pair of top sidewalls extending from opposing lateral sides of the top planar portion;
wherein the bottom section and the top section are connected together along the pairs of top and bottom sidewalls;
wherein an interior surface of each of the pair of top sidewalls and each of the pair of bottom sidewalls comprises a planar surface;
the sleeve has an opening at each of opposing ends, wherein the opening is configured to accept a board end in each of the openings;
a middle section is attached to the bottom section and is configured to prevent boards from going all the way through the sleeve;
wherein the middle section is welded to the bottom section.

2. The concrete form board sleeve connector of claim 1, wherein the top section and bottom section are made from metal.

3. The concrete form board sleeve connector of claim 2, wherein the top and bottom sections are connected via spot welds.

4. The concrete form board sleeve connector of claim 1, wherein there is a window located in the bottom section.

5. The concrete form board sleeve connector of claim 1, wherein the pairs of top and bottom sidewalls are securable via fasteners inserted through apertures disposed through the pairs of top and bottom sidewalls.

6. The concrete form board sleeve connector of claim 1, wherein a length of the middle section is less than a width of the bottom planar portion.

7. The concrete form board sleeve connector of claim 1, wherein a width of the top planar portion is greater than a width of the bottom planar portion, such that pair of bottom sidewalls rest between the pair of top sidewalls when the top section and the bottom section are connected.

8. The concrete form board sleeve connector of claim 1, wherein at least one opening flares outward.

9. A concrete form board sleeve connector, comprising:
a sleeve having a bottom section comprising a U-shaped member having a bottom planar portion and a pair of bottom sidewalls extending from opposing lateral sides of the bottom planar portion;
a top section comprising a U-shaped member having a top planar portion and a pair of top sidewalls extending from opposing lateral sides of the top planar portion;
wherein the bottom section and the top section are connected together along the pairs of top and bottom sidewalls;
wherein the pairs of top and bottom sidewalls are securable via fasteners inserted through apertures disposed through the pairs of top and bottom sidewalls;
wherein an interior surface of each of the pair of top sidewalls and each of the pair of bottom sidewalls comprises a planar surface;
the sleeve has an opening at each of opposing ends, wherein the opening is configured to accept a board end in each of the openings;

a middle section is attached to the bottom section and is configured to prevent boards from going all the way through the sleeve.

10. The concrete form board sleeve connector of claim 9, wherein the top section and bottom section are made from metal.

11. The concrete form board sleeve connector of claim 9, wherein there is a window located in the bottom section.

12. The concrete form board sleeve connector of claim 9, wherein the middle section is cut from the bottom section and bent inwardly.

13. The concrete form board sleeve connector of claim 9, wherein a length of the middle section is less than a width of the bottom planar portion.

14. The concrete form board sleeve connector of claim 9, wherein a width of the top planar portion is greater than a width of the bottom planar portion, such that pair of bottom sidewalls rest between the pair of top sidewalls when the top section and the bottom section are connected.

15. The concrete form board sleeve connector of claim 9, wherein at least one opening flares outward.

* * * * *